Oct. 12, 1948.  S. BERMAN  2,450,868
VARIABLE TRANSFORMER
Original Filed April 13, 1943  2 Sheets-Sheet 1
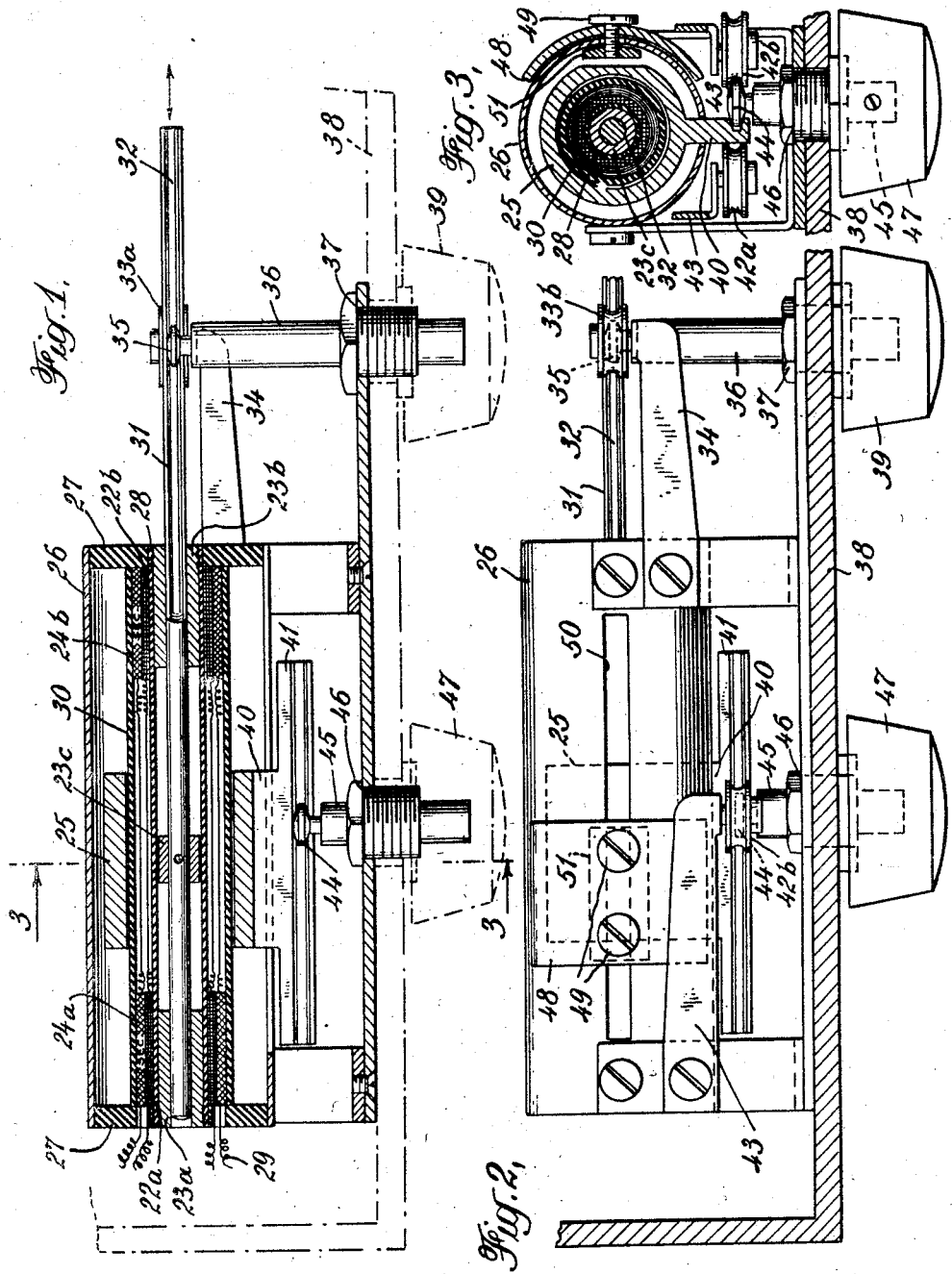
INVENTOR
Samuel Berman
BY
Pennie Davis Marvin Edmonds
ATTORNEYS Oct. 12, 1948.　　　　S. BERMAN　　　　2,450,868
VARIABLE TRANSFORMER
Original Filed April 13, 1943　　　　2 Sheets-Sheet 2
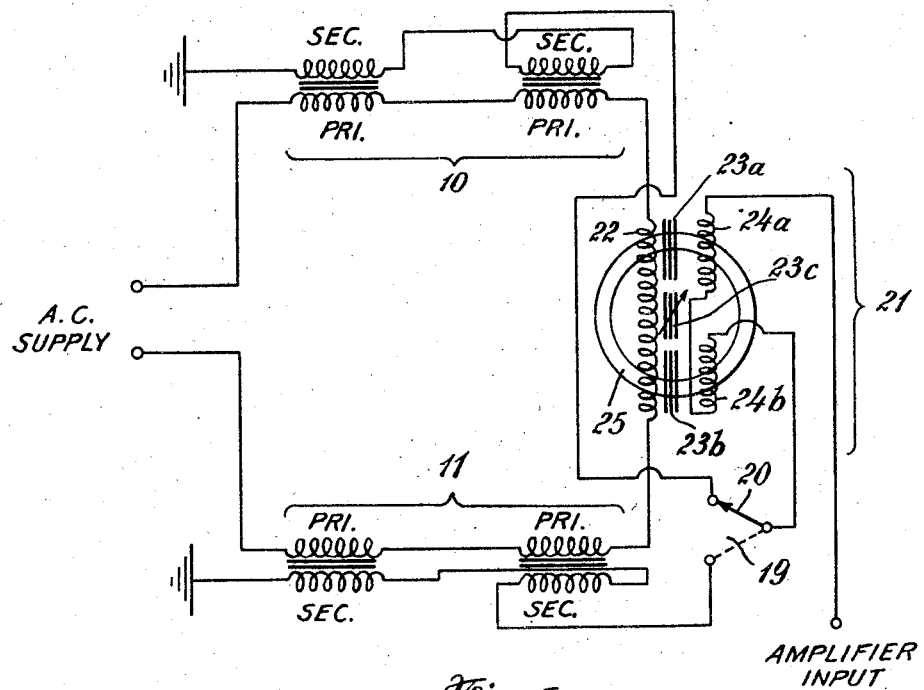
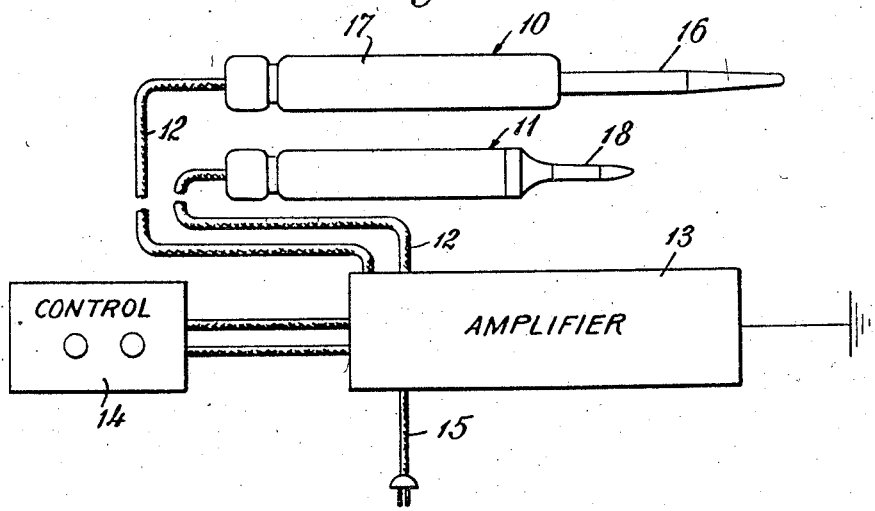
INVENTOR
Samuel Berman
BY
Pennie Davis Marvin Edmonds
ATTORNEYS Patented Oct. 12, 1948

2,450,868

UNITED STATES PATENT OFFICE 2,450,868

VARIABLE TRANSFORMER

Samuel Berman, Richmond Hill, N. Y., assignor to Waugh Equipment Company, New York, N. Y., a corporation of Maine Original application April 13, 1943, Serial No. 482,860, now Patent No. 2,437,455, dated March 9, 1948. Divided and this application February 14, 1945, Serial No. 577,910

9 Claims. (Cl. 171—119)

This invention relates to transformers and is concerned more particularly with a novel control transformer for use in electrical apparatus for the purpose of balancing the outputs of a pair of closely similar transformers having secondaries connected in series opposition. The new control transformer may be employed to especial advantage in association with the apparatus for detecting the presence and determining the location of metallic bodies disclosed and claimed in my Patents 2,321,355 and 2,321,356, both issued June 8, 1943, and an embodiment of the invention suitable for that purpose will be illustrated and described in detail for purposes of explanation. It will be apparent, however, that the utility of the invention is not limited to that particular application.

The detecting apparatus of the patents comprises a probe which includes a pair of transformers mounted within a housing, part of which has the form of a probe shell and the remainder of which serves as a handle. The transformers are closely similar and their primaries are series connected while their secondaries are connected in series but opposed. One of the transformers lies within the probe shell and may be conveniently referred to as the detecting transformer, while the other lies within the handle and may be designated the balancing transformer. In the use of the apparatus, the transformers are first brought to a condition of balance so that on application of voltage to the primaries, no current flows through the secondaries, although for maximum sensitivity, a slight degree of initial unbalance may be desirable. When the apparatus has been adjusted, movement of the probe sufficiently close to a particle of metal will cause a disturbance of the field around the detecting transformer, with the result that current will flow in the secondaries. Such current is fed to the input of an amplifier, which amplifies the current so that it can be used to operate an indicating device, such as a meter, loud speaker, electron ray tube, etc.

The initial balance or slight unbalance of the transformers of such an apparatus is likely to be upset, when the instrument is put into use, because of fluctuations in line voltage and other local conditions, such as stray fields. The apparatus is, accordingly, provided with means for balancing the transformers with respect to both voltage and phase and the balancing means are mounted on the probe where they can be readily manipulated by the surgeon using the instrument.

The provision of balancing means on the probe has been found by experience to involve certain disadvantages, as, for example, when the instrument is in the slightly unbalanced condition for maximum sensitivity and the transformers are thus of unequal inductance, a stray field will affect the transformers unequally and thus cause an erroneous indication. Also, in some circumstances, the surgeon using the probe may accidentally actuate the balancing means and throw the instrument out of adjustment. It has, accordingly, been found desirable to provide the instrument with balancing means which may be controlled at a distance from the probe and is capable of creating the unbalance for maximum sensitivity, even though the probe transformers are themselves precisely balanced.

The present invention is, accordingly, directed to the provision of a control transformer which can be employed for the purpose of balancing, in both voltage and phase, the outputs of a pair of closely similar transformers having secondaries connected in series opposition, as, for example, the detecting and balancing transformers in the probe of the patented apparatus. The new transformer can be disposed in any suitable location and when used with the locator of the patents, it is preferably mounted within the housing for the amplifier and is controllable from the face of the panel of the housing.

The new control transformer includes a primary winding, which is preferably in two sections connected together in series, and a secondary winding, which is in two sections connected in series opposition and in inductive relation to the respective sections of the primary. The primary of the control transformer is connected to a source of energy, which may be the same as that supplying the primaries of the transformers, of which the secondaries are to be balanced, and the secondary of the control transformer is connected in series with the secondaries to be balanced. The control transformer is provided with means for varying the voltages induced in the sections of the secondary thereof with respect to amplitude and, for this purpose, the associated sections of the primary and secondary are wound upon fixed cores, which are coaxial and spaced apart, and a movable core is mounted between the fixed cores. The device is further provided with means for varying the induced voltages with respect to phase, and this variation is effected by means of a member of non-magnetic metallic material, which is mounted for movement relative to the associated primary and secondary sections.

For a better understanding of the invention, reference may be had to the accompany drawings in which Fig. 1 is a view of the control transformer with certain parts shown in longitudinal horizontal section and others in plan;

Fig. 2 is a plan view of the control transformer;

Fig. 3 is a sectional view on the line 3—3 of Fig. 1;

Fig. 4 is a diagram of the electrical circuits; and

Fig. 5 is a diagrammatic view showing the apparatus provided with a large and a small probe.

In the drawings, a form of the new transformer suitable for use with the patented locator is illustrated. This locator includes a large probe 10 and a small probe 11, both probes being provided with cables 12 leading to the housing 13 containing an amplifier and a control unit 14. Current is supplied to the instrument from any convenient source through a cable 15 with the usual plug.

The probes 10 and 11 are of the same general construction as those shown in Patent 2,321,356, and each probe includes a housing having a portion in the form of a probe shell 16 and another portion which serves as a handle. The probe shell encloses a detecting transformer comprising a core and primary and secondary windings wound inductively thereon and within the handle is a balancing transformer of similar construction. The primaries of the two transformers are connected in series while the secondaries are connected in series but opposed. The probe 11 is of the same construction as probe 10 and differs therefrom mainly in that the probe shell 18 is shorter and of smaller diameter than the shell 16.

As shown in the circuit diagram, Fig. 4, the primaries of the control unit and of the detecting and balancing transformers of probes 10 and 11 are all connected in series and supplied with current from a suitable source, although it is to be understood that the control primary may be energized from a separate source of alternating current, if desired. The secondaries of the two probes are connected to two terminals on a switch 19, which has an arm 20 by which a third terminal may be connected to either of the other two.

The new control transformer, generally designated 21, includes a primary 22, illustrated as having the form of a continuous winding, although in the transformer as actually constructed, the primary consists of a pair of wind-sections in axial alignment and spaced apart. Within the primary are stationary cores 23a, 23b and a movable core 23c, all made of magnetic material. The stationary cores are in axial alignment and spaced apart and the movable core lies between them and can be moved to different positions within the space between the fixed cores. The control transformer includes a pair of secondary windings 24a and 24b, which are in inductive relation to the primary and wound on the fixed cores 23a, 23b. The sections of the secondary winding are connected in series but opposed and one end of the windings is connected to the third terminal of switch 19 and the other end to the input of the amplifier (not shown). The control transformer is also provided with a ring 25 of non-magnetic metallic material for phase control purposes, and this ring encircles the windings and can be shifted lengthwise thereof. The primaries of both probes are connected in series with the primary of the control transformer at all times and when one of the probes is to be put into use, the arm 20 of switch 19 is thrown to connect the secondary of the control transformer to the secondaries of the detecting and balancing transformers of the particular probe.

In the manufacture of the probes, the transformers therein have been balanced so precisely that, when current is applied to the primaries, practically no current will flow in the secondaries under the conditions prevailing at the place of manufacture. However, when the apparatus is put into use at a different location, local conditions may upset the initial balance and the adjustable features of the control transformer permit this balance to be re-established or a slight unbalance to be set up, in order that maximum sensitivity may be attained. The secondaries of the control transformer are also initially balanced at the point of manufacture with the movable core 23c and the ring 25 in central positions. To overcome any unbalance arising from local conditions, the movable core 23c is adjusted to balance secondary windings 24a and 24b with respect to the voltages induced therein and, similarly, the ring 25 is adjusted to balance the voltages induced in the secondaries with respect to phase.

The control element may be placed at any convenient location and is preferably mounted in the casing for the amplifier and operable from the panel face of the letter. One form of control transformer suitable for the purpose is shown in Figs. 1, 2, and 3 and it includes a tubular casing 26 of any suitable material provided with end plates 27 having axial openings, within which is seated a tube 28 which extends from end to end of the casing and forms a passage therethrough. Within this passage at opposite ends are the cores of magnetic material 23a, 23b and sections 22a, 22b forming the primary winding 22 of Fig. 4 are wound on tube 28 around the respective cores. While it would be possible to form the primary 22 as a single winding extending throughout the length of tube 28, it is preferable to make this winding in two sections, so that there will be a relatively weak field in the space between the cores. Secondary windings 24a and 24b are wound on the sections of the primary and the leads 29 for the windings pass out through one of the end plates 27. A tube 30 extending between the end plates 27 encloses the pairs of windings.

A rod 31 of non-magnetic material extends through the tubular cores and has a portion projecting out of casing 26. On this rod is mounted the movable core 23c of magnetic material between fixed cores 23a, 23b. Means are provided for moving the rod lengthwise to vary the position of the movable core and, in the construction disclosed, the rod is provided with a longitudinal beveled groove 32. The rod lies between a pair of rollers 33a, 33b mounted on the free ends of leaf springs 34 secured to a part of the mounting for the casing 26. One of the rollers 33a, 33b bears directly against the rod while the other bears against a beveled roller 35 seated in groove 32. Roller 35 is mounted on a shaft 36 supported for rotation in a mounting 37 extending through an opening in the panel 38, which may be the face of the housing containing the amplifier. The end of shaft 36 is provided with a knob 39 operable from the front face of the panel to rotate roller 35 and thereby move the rod 31 lengthwise and shift the position of core section 23c.

Within the housing 26 is the metallic ring 25 of non-magnetic material encircling the tube 30 which encloses the pairs of windings. The ring is provided with an extension 40, which passes through a lengthwise slot in tube 26 and terminates in a plate 41 having a lengthwise beveled groove. The plate lies between rollers 42a, 42b mounted on the end of leaf springs 43 attached to a part of the support of the housing and roller 42b bears against a beveled roller 44 seated in the groove in plate 41. Roller 44 is mounted on a shaft 45 supported in a mounting 46 in the panel 38. A knob 47 on shaft 45 permits roller 44 to be rotated to move the ring 25 lengthwise of tube 30.

In order that the opposed secondaries of the control transformer may be initially balanced at the time of their manufacture, with core section 23c and ring 25 in central positions, a balancing member 48 is adjustably mounted on the outside of tube 26 and is held in place thereon in adjusted condition by a pair of screws 49 which pass through a lengthwise slot 50 in tube 26 and enter a clamping plate 51 within the tube. By loosening the screws, the member 48 may be shifted lengthwise of the tube 26 to the desired balancing position and then held securely in place by tightening the screws.

In the control device described, the primary winding is illustrated as being in two sections mounted at opposite ends of the housing around core sections 23a, 23b and, although a single primary winding extending from end to end of the casing could be used, the division of the primary into spaced sections is preferred. The reason is that by spacing the primary sections, the field within the central region within the casing is relatively weak and the effect of shifting the movable core 23c and ring 25 is thereby reduced, so that adjustment of these elements to obtain proper balance of the control secondaries is less critical.

When the new control transformer is used in association with the patented locating apparatus, the detecting and balancing transformers in the probes of the locator may be precisely balanced at the place of manufacture and any unbalance arising from local conditions at the point of use of the apparatus is then overcome by manipulating the movable core and the phasing ring of the control device. Movements of the movable core by its knob make it possible to balance the control secondaries with respect to the values of the voltages induced therein by a flow of current through the control primary and, similarly, shifting of the phasing ring by its knob makes possible the balancing of the secondary voltages with respect to phase. It is to be understood that the desired unbalance for maximum sensitivity may similarly be obtained and, since this unbalance is in the control device and not in the transformers of the probe, a stray field will affect both detecting and balancing transformers of the probe substantially equally and no errors in indication will result from the existence of the field.

This application is a division of my co-pending application, Serial No. 482,860, filed April 13, 1943, now Patent No. 2,437,455 dated March 9, 1948.

The claims are:

1. A control transformer comprising a primary winding, a pair of secondary windings in inductive relation to the primary and connected in series but opposed, the secondaries being spaced apart, a pair of spaced fixed hollow cores, one within each secondary, the cores being axially aligned, a movable core between the fixed cores, a rod attached to the movable core and extending through at least one of the fixed cores, and a non-magnetic metallic member adjustable to vary the effect of the field of the primary on the respective secondaries.

2. A control transformer comprising a primary winding made up of a pair of series connected sections in axial alignment, a pair of secondary windings in inductive relation to the respective sections of the primary and connected in series but opposed, a fixed hollow core within each primary section and its related secondary, a core between said fixed cores and movable relatively thereto, a rod attached to the movable core and extending through at least one of the fixed cores, and a non-magnetic metallic member adjustable to vary the effect of the field of the primary on the respective secondaries.

3. A control transformer comprising a pair of spaced fixed hollow cores in axial alignment, a primary and a secondary winding in inductive relation on each core, the primaries being connected in series and the secondaries being connected in series but opposed, a movable core lying between and in axial alignment with the fixed cores, and means for moving the movable core, said means including a rod attached to the movable core and extending through at least one of the fixed cores.

4. A control transformer comprising a pair of spaced hollow cores in axial alignment, a primary and a secondary winding in inductive relation on each core, the primaries being connected in series and the secondaries being connected in series but opposed, a non-magnetic rod extending through at least one core, a core on the rod between the hollow cores, and means acting on the rod for moving it endwise to shift the core therein relative to the pairs of windings.

5. A control transformer comprising a pair of spaced hollow cores in axial alignment, a primary and a secondary winding in inductive relation on each core, the primaries being connected in series and the secondaries being connected in series but opposed, a non-magnetic rod extending through at least one core, a core on the rod between the hollow cores, a ring of non-magnetic metallic material in axial alignment with the cores and of greater internal diameter than the outer diameter of the pairs of windings, a casing enclosing the windings, cores, and ring, the rod projecting out of the housing, an element connected to the ring and projecting out of the housing, and means outside the housing and operable on the exposed portions of the rod and element for shifting the rod and the core carried thereby and the ring.

6. A control transformer which comprises a primary winding, a pair of secondary windings in inductive relation to the primary and disposed coaxially in spaced relation, stationary hollow cores, one within each secondary, a core disposed between the stationary cores and mounted for movement axially thereof, a casing enclosing the windings and cores, and means for moving the movable core, said means including a rod attached to the movable core and extending through at least one of the hollow cores and out of the casing.

7. A control transformer which comprises a primary winding, a pair of secondary windings in inductive relation to respective sections of the primary and disposed coaxially in spaced relation, stationary cores, one within each secondary, a non-magnetic rod extending through at least one core, a core on the rod between the hollow cores, a non-magnetic metallic member mounted for axial movement relative to the secondary windings, an element attached to the member, a housing enclosing the windings, cores, and member, the rod and element projecting out of the housing, and means outside the housing and operable on the exposed portions of the rod and element for moving the latter to shift the positions of the core on the rod and of the member.

8. A control transformer which comprises a primary winding, a pair of axially aligned secondary windings in inductive relation to respective sections of the primary and connected in series opposition, stationary cores, one within each secondary, the cores being in axial alignment, a non-magnetic member forming a closed circuit of greater diameter than the windings, means for supporting the member coaxially with the windings, and means for moving the member from end to end of the secondary windings, said means including an element attached to the non-magnetic member and extending lengthwise of the windings, and a rotary member mounted for rotation on a fixed axis transverse to the axis of the windings and engaging the element, the rotary member being manually operable to move the element and non-magnetic member.

9. A control transformer which comprises a primary winding, a pair of axially aligned secondary windings in inductive relation to respective sections of the primary and connected in series opposition, stationary cores, one within each secondary, the cores being in axial alignment, a non-magnetic member forming a closed circuit of greater diameter than the windings, a casing enclosing the windings, cores, and member, the casing having a lengthwise slot, an element attached to the member and projecting out of the casing through the slot, the element extending lengthwise of the windings, and a rotary member outside the casing and mounted for rotation on a fixed axis transverse to the axis of the windings, the rotary member engaging the element and being manually operable to move the element and non-magnetic member lengthwise of the windings.

SAMUEL BERMAN.

REFERENCES CITED

The following references are of record in the file of this patent:

UNITED STATES PATENTS

| Number | Name | Date |
|---|---|---|
| 895,914 | Troy | Aug. 11, 1908 |
| 2,007,477 | Nickel | July 9, 1935 |
| 2,321,356 | Berman | June 8, 1943 |
| 2,354,365 | Crossley | July 25, 1944 |